UNITED STATES PATENT OFFICE.

ALFRED PHILIPS AND MORITZ VON GALLOIS, OF HÖCHST-ON-THE-MAIN, GERMANY, ASSIGNORS TO THE FARBWERKE, VORMALS MEISTER, LUCIUS & BRÜNING, OF SAME PLACE.

PROCESS OF DYEING ON FIBER.

SPECIFICATION forming part of Letters Patent No. 625,198, dated May 16, 1899.

Application filed August 31, 1898. Serial No. 689,922. (No specimens.)

*To all whom it may concern:*

Be it known that we, ALFRED PHILIPS, Ph. D., a citizen of the Kingdom of the Netherlands, and MORITZ VON GALLOIS, chemist, a citizen of the Empire of Austria-Hungary, both residing at Höchst-on-the-Main, Germany, have invented certain new and useful improvements in the process for the production on the fiber of azo colors insoluble in water in tints varying from violet-black to dark-black tints, of which the following is a specification.

Since the introduction in cotton-printing of insoluble naphtholazo colors produced on the fiber the want has made itself felt of being able to combine these colors with a fast black easily applied, a want which hitherto has only been imperfectly satisfied. Since, as is known, the alkaline naphthol preparation of the tissue to be printed did not permit the production of a good and reliably-acting anilin-black, a printing-black obtained from logwood extract was at first employed, which adhered to the tissue only in a very imperfect manner, as in consideration of the corresponding azo colors a prolonged steaming, such as is requisite for the complete fixing, had to be omitted. It was therefore endeavored to produce the black as azo color direct on the fiber, and results worthy of notice have been obtained in this promising direction.

Experiments to form the black as azo color direct on the fiber have been made hitherto according to the following methods: 1. Production of black as a mixed color from a dark violet or blue with brown, red, or orange in such a manner that on the tissue grounded with beta-naphthol sodium, mixtures of tetrazo or diazo compounds of dianisidin, benzidin, tolidin, para-nitranilin, meta-nitranilin, or beta-naphthylamin, &c., were printed. 2. Production of black on beta-naphthol ground by applying very powerful tetrazo compound of certain diamidobases and diamidoazobases—for instance, para-amido-benzineazoalphanaphthylamin, amidochrysoidin, &c. 3. Production of black from diazocompounds by means of substituted naphthols, particularly amidonaphthols by themselves or mixed with beta-naphthol.

For want of better methods that described under 1 is much used at present. The black tints obtained can only claim the name of black as very concentrated colors. Besides, this method has the drawback of inferior durability of the printing color and variable results caused by the application of mixtures of various easily-decomposed diazocompounds. Method 3, on the other hand, permits only of a limited application, rendered complicated by its very nature. Of the bases employed according to Method 2 only para-amidobenzolazoalphanaphthylamin has hitherto yielded a dark and pure black, and a general application of this diamidoazo body failed on account of the foaming of the diazo printing color and its decomposition when printing in hot places.

We have shown in the American patent application, Serial No. 669,239, filed February 5, 1898, that diamidocarbazols are very appropriate for producing powerful and fast brown tints on naphthol ground, and we have now succeeded in obtaining a dark violet and violet-black by coupling the tetrazocompound of dimethylated diamidocarbazol with beta-naphthol on the fiber.

The introduction of two methyl groups into the molecule of para-diamidocarbazol evidently increases the tinctorial power of the beta-naphtholazo dyestuff and changes the tints of the same in the direction of blue.

The diazo color printed in a sufficiently-strong concentration yields on the usual beta-naphthol ground a full violet-black, very fast to soap and light, and the prepared diazo printing color is also sufficiently stable for practical use.

By a first print of resisting agents, tin salts or sulfite colors the black can also be resisted in white or variegated.

The application of diamidodimethylcarbazol for producing black on the fiber by way of printing is carried out in the known manner.

Example: Naphthol ground: thirty grams beta-naphthol; fifty cubic centimeters caustic soda lye, 22° Baumé; fifty grams tragacanth-water, 60:1,000; thirty grams ricenoleate of ammonia; total, one liter. Printing color: five hundred cubic centimeters diazo solution; five hundred grams flour thickening; sixty grams acetate of sodium.

Thirty-three grams diamidodimethylcarbazol sulfate are dissolved with fifteen grams sulfuric acid of 66° Baumé and three hundred cubic centimeters water, cooled by the addition of one hundred grams ice, to which is added fifty-two cubic centimeters solution of sodium nitrite 290:1,000. After diazotation the solution is filtered and made up to five hundred cubic centimeters.

The above printing color is printed on the cotton goods provided with naphthol ground, then dried, washed, and soaped in the usual manner.

Having now described our invention, what we claim is—

The herein-described process of producing on the fiber azo colors insoluble in water, from violet-black to dark black, which consists in grounding the goods with naphthol and combining therewith the tetrazocompounds of diamidodimethylcarbazol by way of printing or dyeing, substantially as set forth.

In testimony that we claim the foregoing as our invention we have signed our names in presence of two subscribing witnesses.

ALFRED PHILIPS.
MORITZ VON GALLOIS.

Witnesses:
HEINRICH HAHN,
ALFRED BRISBOIS.